Aug. 27, 1935.  T. B. MYERS  2,012,516
MOTOR DRIVEN BEATER
Filed Sept. 30, 1929  2 Sheets-Sheet 1

Inventor:
Thomas B. Myers
by Bertha L. MacGregor
Atty.

Aug. 27, 1935.   T. B. MYERS   2,012,516
MOTOR DRIVEN BEATER
Filed Sept. 30, 1929.   2 Sheets-Sheet 2
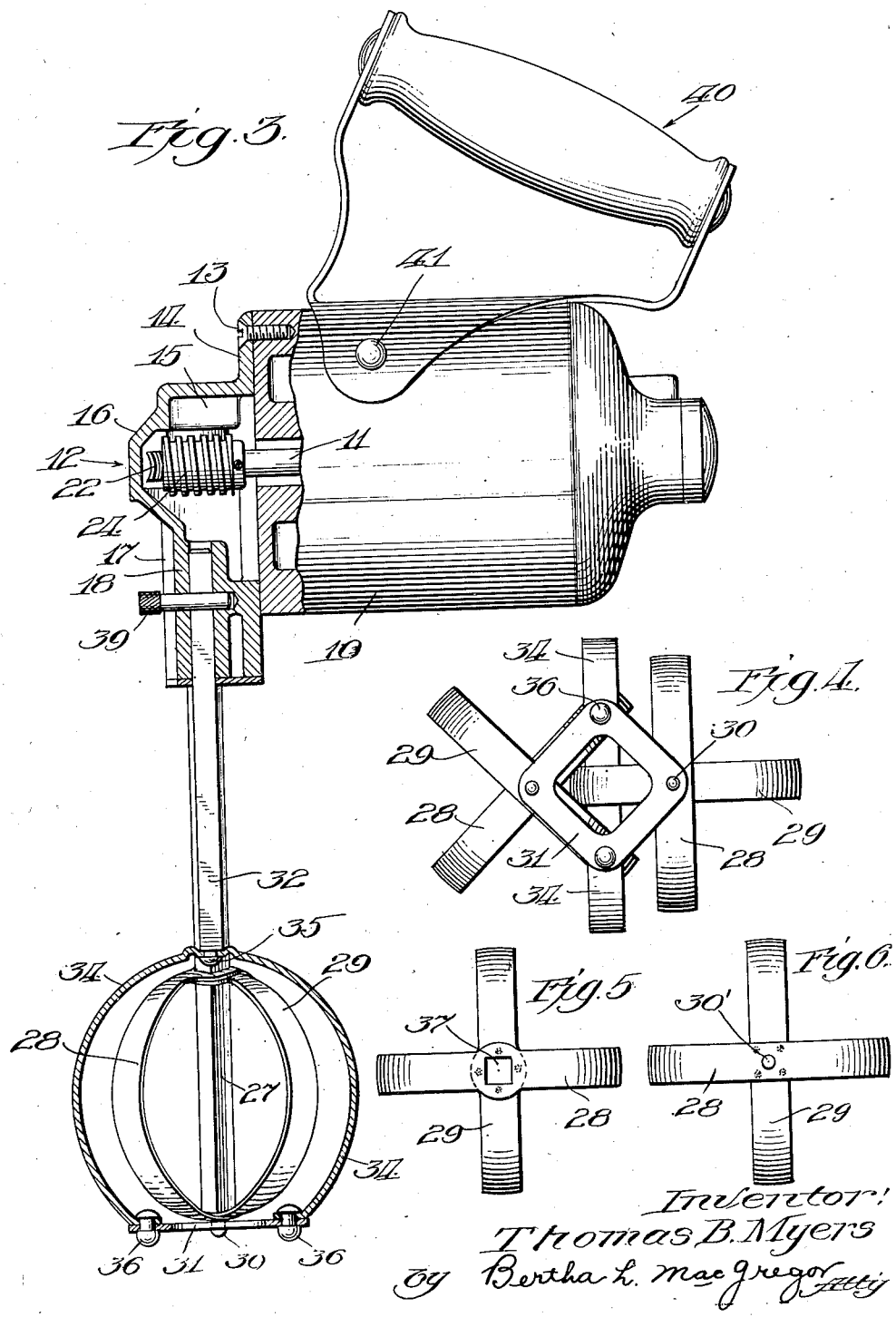

Patented Aug. 27, 1935

2,012,516

UNITED STATES PATENT OFFICE 2,012,516

MOTOR DRIVEN BEATER

Thomas B. Myers, Racine, Wis., assignor to Hamilton Beach Manufacturing Company, Racine, Wis., a corporation of Wisconsin Application September 30, 1929, Serial No. 396,148

14 Claims. (Cl. 259—131)

This invention relates to motor driven beaters intended for beating eggs, whipping cream, mixing batters, and the like.

The main object of the invention is to produce a portable beater of compact form comprising a motor, a gear casing, and an agitator unit, the gear casing being rigidly secured to the motor, and the agitator unit being quickly and easily detachable from the gear casing for cleansing purposes, and capable of being readily replaced to establish the normal operative connection between the motor and agitator rods.

One of the advantages of the invention is that all the parts of the device which require cleansing as a result of being used for their intended purposes are detachable from the gear casing as a single unit by a very simple movement on the part of the operator.

Another advantage of the invention is that the agitator rods are freely rotatable, but are well supported in upper and lower bearings, by which they are maintained in vertical alignment in use.

The drive mechanism for rotating the agitator rods in opposite directions is strong and compact and is such that the rods are driven at a desired speed directly from the motor shaft without the intervention of speed reduction gears and without having one of said rods driven from the other.

Other advantages will appear from the following specification.

In the drawings:—

Fig. 3 is a side elevation, partly in the section indicated by the line 3—3 on Fig. 2.

Fig. 4 is a bottom plan of the agitator unit shown in Figs. 1 and 2.

Fig. 5 is a top plan of one set of beater rings detached from the agitator rod.

Fig. 6 is a bottom plan of the rings shown in Fig. 5.

Figure 1:
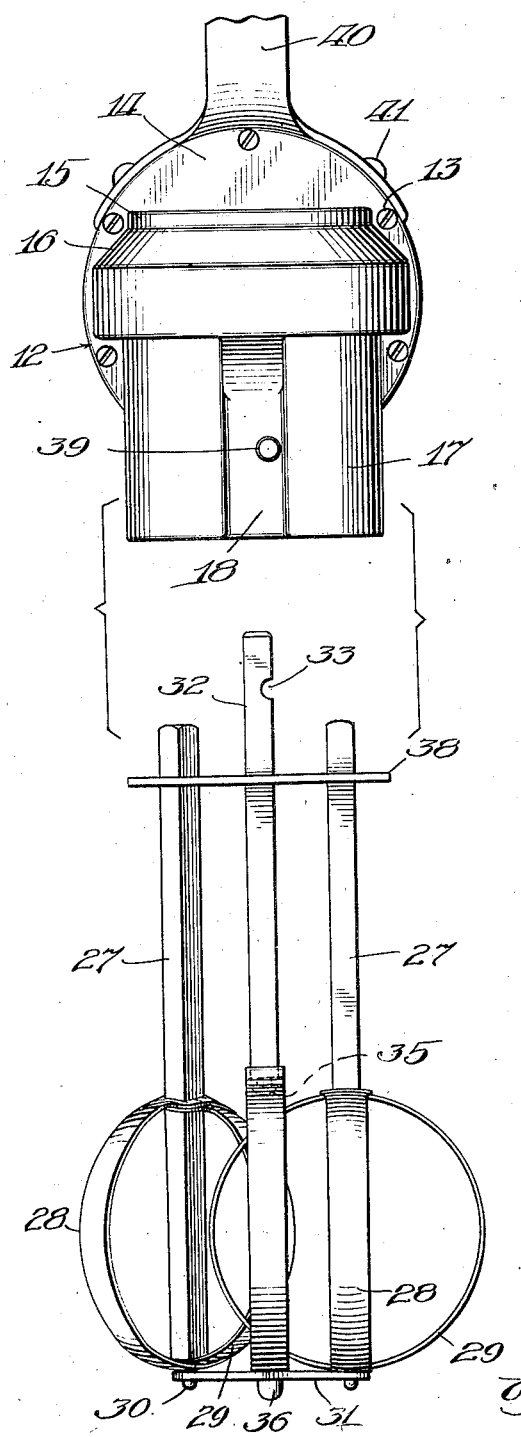
Fig. 1 is a front elevation of a beater embodying my invention, the agitator unit being shown in detached position relative to the gear casing and motor.

In that embodiment of my invention shown in the drawings, 10 indicates the motor in its housing, with a motor shaft 11 extending forwardly of the motor casing into a gear casing 12 which is secured to the end of the motor by screws 13.

The gear casing 12 is vertically disposed and is relatively narrow from its front wall to the motor and is particularly designed to accommodate the gearing and agitator mounting in a very compact manner. Said gear casing comprises a casting having a flange 14 which fits against the end of the motor, an upper block portion 15 extending forwardly from the flange 14, an angular or curved wall 16 which extends forwardly from the part 15, downwardly and then inwardly to the front of the lower block portion 17 of the casting, which is narrowest in its median portion indicated at 18.

Figure 2:
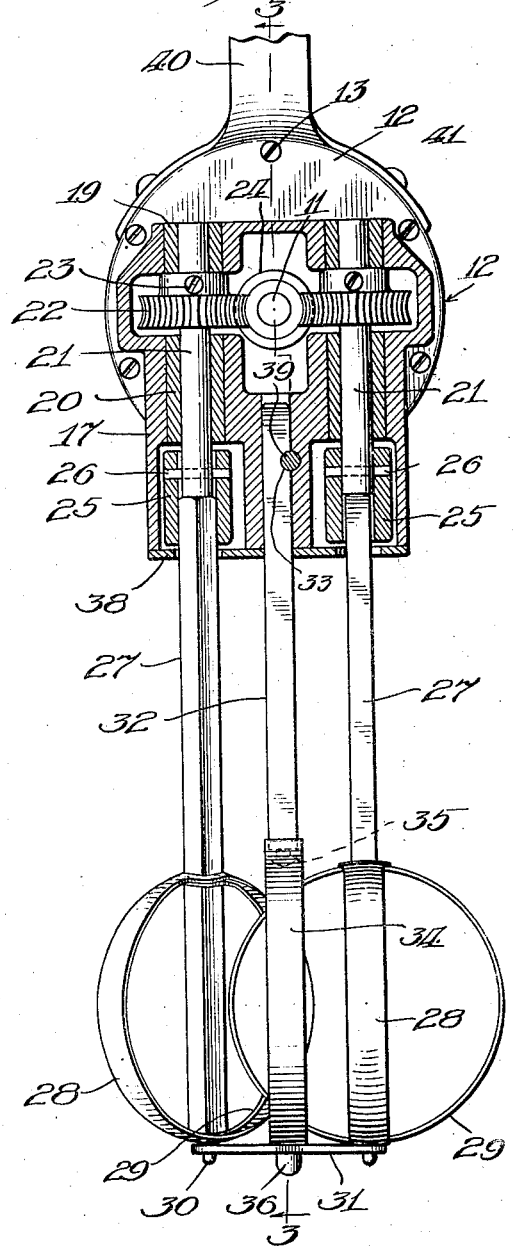
Fig. 2 is a front elevation, partly in section, showing the agitator unit in operative position.

The casting 12 is recessed inwardly from the motor side to the wall 16, as best shown in Fig. 2, to provide a gear chamber, in communication with the motor. The parts 15 and 17 are bored vertically near each side to receive bushings 19 and 20, respectively, which form spaced apart bearings for the rotatable shafts 21. A worm wheel 22 is keyed to each shaft 21, as indicated at 23, said worm wheels being located between the vertically spaced bushings 19 and 20, and are in mesh with opposite sides of a worm gear 24 on the motor shaft 11.

Below each bushing 20 the part 17 of the gear casing 12 is recessed inwardly from its bottom to provide room for a sleeve 25 keyed to the shaft 21 by a pin 26, whereby the sleeve rotates with the shaft 21. The sleeve 25 is shaped to receive the upper end of one of the square agitator rods 27, which carry the beater rings 28 and 29. The part 18 of the casing 12 is also bored vertically, inwardly from its bottom, for a purpose to be described.

The detachable agitator unit comprises the agitator rods 27 and a central supporting member which is associated with said agitator rods. The rods 27 terminate in studs 30 which are rounded at their ends and are circular in cross section so as to be rotatable in an apertured bearing member or base 31. The central supporting member consists of a rod 32 notched near its upper end as indicated at 33 and having a pair of curved arms 34 secured to its lower end by a screw 35. The arms 34 are sufficiently long and spread apart to enable the rings 28 and 29 on the rods 27 to be rotated without interference with said arms. The lower ends of the arms 34 are fastened to opposite corners of the square shaped base 31 by rivets 36 or other fastening means.

The beater rings 28 and 29 are made of narrow, thin strips of metal, slightly widened at the place where they cross each other at the top and are apertured at 37 to receive the square rod 27. Where they cross at the bottom they are apertured at 30' to fit the stud 30. The rings 28 and 29 may be welded together at the top and bottom as indicated in Figures 5 and 6.

A flat rectangularly shaped plate 38 is apertured to permit the uper ends of the square rods 27 to extend losely through the plate near each end of it, and is apertured centrally to fit the supporting rod 32 to which the plate is secured somewhat below the upper end of said rod. This plate 38 and base 31 hold the rods 27 and 32 together as a unit, and when in position in the beater the plate 38 forms the lower wall of the gear casing 12.

To secure the agitator unit in operative position said unit is moved upwardly from the position shown in Fig. 1 until the supporting rod 32 is seated in the central bore in the part 18 of the gear casing and the agitator rods 27 are seated in the sleeves 25. The plate 38 then constitutes a bottom for the gear casing 12. A headed plunger 39 is then inserted through a horizontally disposed aperture in the casing until it engages the notched surfaces 33 of the rod 32 and holds the unit against vertical displacement.

A handle 40 is secured to the motor casing at 41.

When the motor is started, the worm gear 24, meshing with the worm wheels 22, will drive the shafts 21 in opposite directions, thereby rotating the sleeves 25 and the square agitator rods 27. The supporting rod 32 and its arms 34 are stationary. The rounded fastening means 36 in the base 31 extend below the rotatable studs 30 so that when the device is in use it rests upon said rounded surfaces of the fastenings 36, and the shafts 27 and studs 30 are freely rotatable in their upper and lower bearings.

The beater rings 28 and 29 are held against vertical displacement on the studs 30 and rods 27 by bearing against the shoulder formed at the bottom of the rod 27, and are held against lateral displacement by the engagement of the margins of the square aperture 37 and the square rod 27.

Obviously, changes in detail of construction may be made without departing from the scope of my invention, and I do not intend to be limited to the precise form shown and described, except as pointed out in the appended claims.

I claim:

1. A motor driven beater comprising a motor, a gear casing rigidly connected to the motor, a motor shaft extending into said gear casing, a pair of rotatable shafts journalled in the gear casing and operatively connected to the motor shaft, and a quickly detachable agitator unit, including a pair of agitator rods having beater elements thereon, the upper end of each agitator rod extending into the gear casing into axial alignment and operative engagement with one of said rotatable shafts, said agitator rods being quickly removable from operative engagement with the shafts in the gear casing by moving the agitator rods axially in a direction away from the gear casing.

2. A motor driven beater comprising a motor, a gear casing rigidly connected to the motor, a motor shaft extending into said gear casing, a worm gear on the motor shaft, a pair of rotatable shafts in the gear casing, each having keyed to it a worm wheel in mesh with the worm gear on the motor shaft, and a quickly detachable agitator unit, including a pair of agitator rods having beater elements thereon, the upper end of each agitator rod extending into the gear casing into axial alignment and operative engagement with one of said rotatable shafts, said agitator rods being quickly removable from operative engagement with the shafts in the gear casing by moving the agitator rods axially in a direction away from the gear casing.

3. A motor driven beater comprising a motor, a gear casing rigidly connected to the motor, the motor shaft extending into said gear casing, a pair of rotatable shafts journalled in the gear casing and operatively connected to the motor shaft, an agitator unit including a pair of agitator rods, and non-rotatable supporting means associated with the agitator rods, and means for quickly detachably mounting said unit in the gear casing with the agitator rods in operative engagement with said rotatable shafts, said last mentioned means comprising a removable plunger extending into the gear casing and removably engaging the supporting means of the agitator unit.

4. A motor driven beater comprising a motor, an open bottom gear casing rigidly connected to the motor, the motor shaft extending into said gear casing, a pair of shafts journalled in the gear casing and operatively connected to the motor shaft to be rotated in opposite directions, and an agitator unit including a pair of agitator rods, a central supporting rod, a base to which said central supporting rod is secured and in which said agitator rods are rotatably mounted, a plate connected to said central rod near its upper ends, and means for detachably mounting said unit in the gear casing with the agitator rods in operative engagement with said rotatable shafts, and said plate closing the bottom of the gear casing.

5. A motor driven beater, comprising a motor, a gear casing rigidly connected to the motor, the motor shaft extending into said gear casing, a pair of rotatable shafts journalled in the gear casing and operatively connected to the motor shaft, and an agitator unit including a pair of agitator rods carrying beater elements, a central supporting rod having curved arms at its lower end, a base to which said curved arms are secured and in which said agitator rods are rotatably mounted, and means for detachably mounting said unit in the gear casing with the agitator rods in operative engagement with said rotatable shafts.

6. A motor driven beater, comprising a motor, a gear casing rigidly connected to the motor, the motor shaft extending into said gear casing, rotatable shafts each journalled in upper and lower bearings formed in the gear casing, a worm wheel on each shaft between said bearings, a worm gear on the motor shaft, and a quickly detachable agitator unit including a pair of agitator rods having beater elements thereon and a supporting rod associated with the agitator rods, said agitator rods being mounted in the gear casing in detachable operative engagement with said rotatable shafts, and the supporting rod being removably and non-rotatably held in the gear casing.

7. A motor driven beater, comprising a motor, a gear casing rigidly connected to the motor, the motor shaft extending into said gear casing, a pair of rotatable shafts journalled in the gear casing and operatively connected to the motor shaft, a sleeve carried on the lower end of each of said shafts, and an agitator unit including a pair of agitator rods having beater elements thereon, detachably mounted in the gear casing with the rods in engagement with said sleeves on the rotatable shafts.

8. A motor driven beater, comprising a motor, a gear casing rigidly connected to the motor, the motor shaft extending into said gear casing, a pair of rotatable shafts journalled in the gear casing and operatively connected to the motor shaft, a sleeve carried by the lower end of each of said shafts, internally angular in cross section, and an agitator unit including a pair of agitator rods having beater elements thereon, detachably mounted in the gear casing in engagement with said sleeves, the agitator rods being angularly shaped to fit in said sleeves and be rotated with said shafts.

9. A motor driven beater, comprising a motor, a gear casing rigidly connected to one end of the motor, the motor shaft extending horizontally into said gear casing, a worm gear on the motor shaft, a pair of vertical, rotatable shafts journalled in the gear casing each shaft having keyed to it a worm wheel in mesh with the worm gear on the motor shaft, and an agitator unit including a base and a pair of agitator rods having beater elements thereon mounted in the base, said units being detachably mounted in the gear casing with the agitator rods in operative engagement with said rotatable shafts.

10. A motor driven beater comprising a motor, a gear casing rigidly connected to the motor, the motor shaft extending into said gear casing, a pair of rotatable shafts journalled in the gear casing and operatively connected to the motor shaft, an agitator unit including a pair of agitator rods, a central supporting rod, a base, means for rigidly fastening said central supporting rod to the base, and a stud on each agitator rod rotatably mounted in said base, and means for detachably mounting said agitator unit in the gear casing with the agitator rods in operative engagement with said rotatable shafts, said means for fastening the central supporting rod in the base being rounded on its lower surface and extending below the ends of the agitator rod studs mounted in the base.

11. A motor driven beater comprising a motor, a gear casing rigidly connected to one end of the motor, said gear casing comprising upper and lower block members spaced apart vertically from each other, said blocks being bored vertically near each side and the lower block being bored inwardly from its bottom midway between said first mentioned bores, the motor having a shaft extending horizontally into the gear casing between said upper and lower block members, a pair of rotatable shafts located in the bores at the sides of the casing, a worm wheel on each shaft between said block members, and an agitator unit comprising a central supporting rod having its upper end located in said central bore of the gear casing, and a pair of agitator rods, carrying beater elements, in operative engagement with said rotatable shafts in the gear casing.

12. In a motor driven beater, the combination of a motor having a casing and a motor shaft protruding from said motor casing, a separate gear casing carried by said motor casing, a pair of beater shafts journaled in said gear casing, operative mechanical connections in said gear casing for driving said beater shafts in opposite directions from said motor shaft, a pair of beaters actuated by said beater shafts, and a removable framework for supporting said beaters on said shafts.

13. In a motor driven beater, the combination of a motor having a casing and a motor shaft protruding from said motor casing, a separate gear casing carried by said motor casing, a pair of beater shafts journaled in said gear casing, a worm gear on the motor shaft, a worm wheel fixed to each of the beater shafts for meshing with said worm gear to drive said beater shafts in opposite directions from said motor shaft, a pair of beaters actuated by said beater shafts, and a removable framework for supporting said beaters on said shafts.

14. A motor driven beater comprising a motor, a gear casing rigidly connected to the motor, the motor shaft extending into said gear casing, a pair of rotatable shafts journalled in the gear casing and operatively connected to the motor shaft, an agitator unit including a pair of agitators, and non-rotatable supporting means associated with the agitators, and means for detachably mounting said unit in the gear casing with the agitators in operative engagement with said rotatable shafts.

THOMAS B. MYERS.